3,271,163
REMOVAL OF RADIOACTIVE MATERIAL FROM MILK BY ION EXCHANGE
Emil A. Malick, Bartlesville, Okla., assignor to Phillips Petroleum Company, a corporation of Delaware
Filed Jan. 28, 1963, Ser. No. 254,121
3 Claims. (Cl. 99—60)

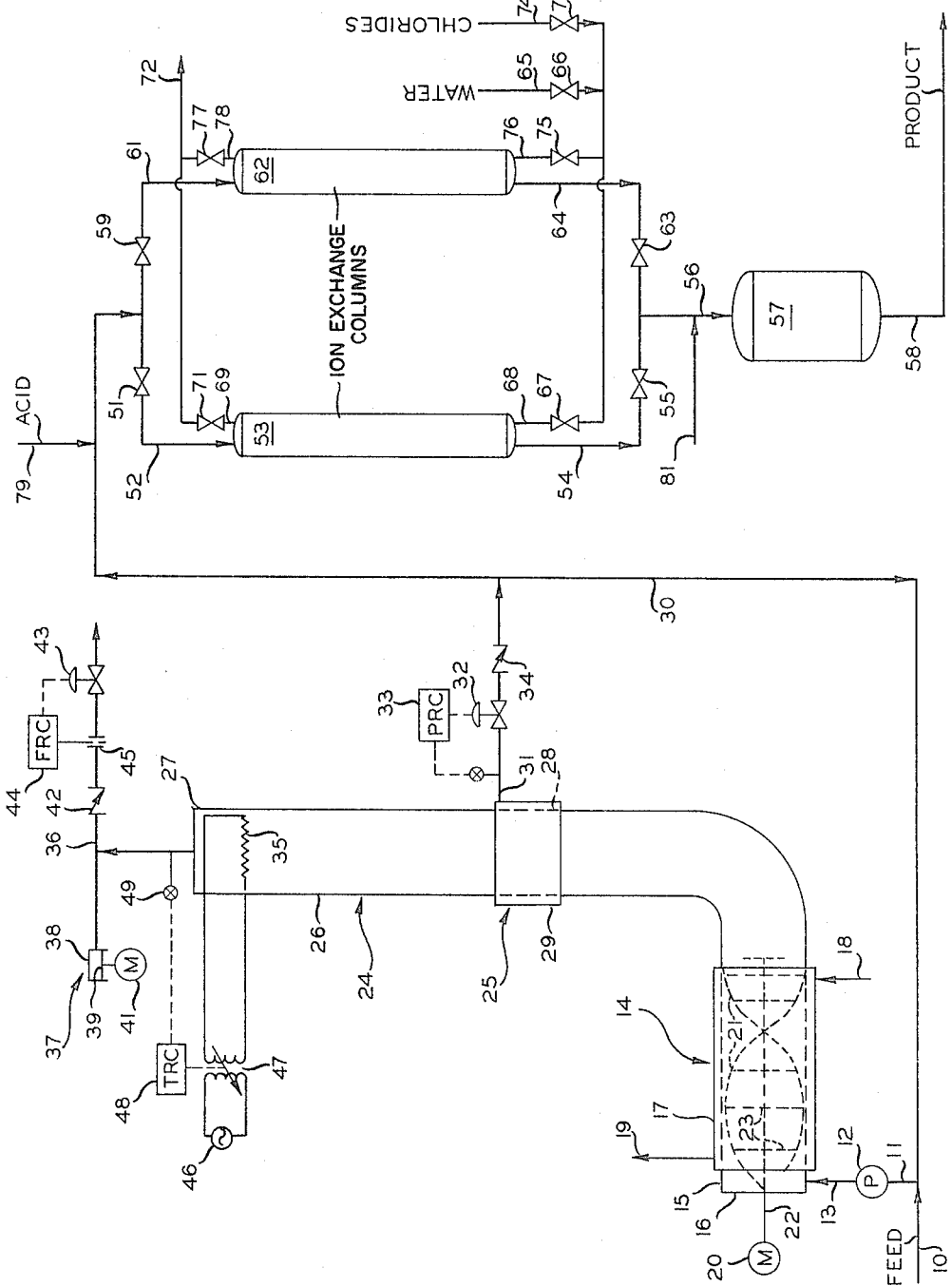

This invention relates to method and apparatus for removing a radioactive material from a fluid containing the same. In one aspect the invention relates to the removal of strontium from milk, and particularly the radioactive isotopes of strontium.

The contamination of milk with strontium 90 from radioactive fallout can be a serious problem in the event of increased nuclear testing or a nuclear war. Milk is one of the basic foods which is consumed in substantial quantities by a large percentage of the population and is of particular importance to children. Large diary areas could be rendered useless from time to time by an increase in the content in the milk of radioactive materials, such as strontium 90. It is desirable that the milk industry be prepared to fill such "gaps" as they arise. This would require shipment of milk from distant unaffected areas. In the event of the contamination occurring over a large area, it would be desirable to decontaminate the milk in the lesser-affected areas and transport the decontaminated milk to areas requiring milk. Thus it has become desirable to find an inexpensive method by which milk from cows which have been subjected to radioactivity either directly or indirectly by way of their food intake can be processed to produce milk substantially free of radioactivity.

It has been found that strontium can be removed from milk by the passage of the milk through suitable ion exchange media. It has further been found that substantially fewer ion exchange beds are required where the milk is first concentrated in a fractional crystallization process. The concentration of the milk in a fractional crystallization process makes possible substantial savings in storage and transportation costs of the treated milk while retaining the flavor of fresh milk. Concentrating the milk in a fractional crystallization process also permits the concentrated milk to be stored for longer periods of time at less cost either before or after passing the concentrated milk through the ion exchange media.

Accordingly it is an object of the invention to provide method and apparatus for removing radioactive materials from a fluid containing the same. Another object of the invention is to provide an inexpensive method for the removal of radioactive materials from a fluid, for example, milk. Another object of the invention is the removal of radioactive materials from a fluid with a minimum number of ion exchange beds. A still further object of the invention is to provide method and means for producing milk which is substantially free of radioactive materials and which can be stored or transported for long periods of time at less cost than fresh milk.

Other objects, aspects and advantages of the invention will be apparent from a study of the disclosure, the drawing and the appended claims to the invention.

Referring now to the drawing, wherein there is set forth a schematic representation of a system in accordance with the invention, a feed stream comprising a milk to be processed, is passed through conduit 11 and is forced by means of pump 12 through conduit 13 into chilling section 14. Chilling section 14 comprises an inner cylindrical shell 15 one end of which is closed by means of an end member 16, and a cooling jacket 17 having an inlet 18 and an outlet 19. Agitating or scraping means 21 are positioned within cylindrical shell 15 and are designed to prevent the accumulation of solid material on the inner surface of cylindrical shell 15. Scraping means 21 can be constructed of strips of metal or other suitable material known in the art and can be fabricated in the form of a helix, as shown in the drawing, or can be straight. Any suitable form of scraping means 21 can be provided. Scraping means 21 is mounted on a rotatable shaft 22 by means of members 23. Shaft 22 is axially positioned within cylindrical shell 15 and is connected to any suitable source of power which rotates the scraping means, such as motor 20. Shaft 22 is suitably sealed in end member 16 by means of a packing gland of any desired type known in the art. Cooling of the feed which enters chilling section 14 can be provided by passing a suitable coolant through inlet 18 and withdrawing the coolant through outlet 19. Sufficient cooling in chilling section 14 is provided so that a predetermined amount of solid crystals is produced from the feed passing therethrough. The resulting slurry of crystals in mother liquor is passed into purification column 24 which comprises filtration section 25, reflux section 26, and melting section 27. Filtration section 25 comprises a suitable filter screen or medium 28 and an external shell 29, the latter being provided with an outlet pipe 31 through which the filtrate, that is the mother liquor, is passed. Filter medium 28 can be of any desired type known in the art. For example it can comprise a metallic screen, a sintered perforate metal member or a perforate metal member supporting a filter cloth. It is desirable that the filter member 28 be positioned integrally with respect to adjacent wall of reflux section 26. Although filtration section 25 has been illustrated in the drawing as being an external filter, it is within the scope of the invention to utilize an internal filter, in which event, external shell 29 could be positioned integrally with respect to the wall of reflux section 26, and filter medium 28 would be disposed within shell 29 and preferably positioned axially with respect to purification column 24. The filtrate produced in filtration section 25 is removed from purification column 24 through conduit 31. Conduit 31 can contain a suitable means for maintaining a predetermined back pressure, such as valve 32 which is regulated by pressure recorder controller 33 responsive to the pressure in conduit 31. A check valve can be provided in conduit 31 to prevent the back flow of withdrawn filtrate. If desired, a portion of the mother liquor can be recycled by way of conduit 30 to the inlet of pump 12.

The crystal mass is passed into reflux section 26 wherein it is countercurrently contacted with liquid reflux as subsequently described. As the crystal mass approaches heating element 35 in melting section 27, the crystals are melted. The melt produced by the heat from heating element 35 is withdrawn through product withdrawal conduit 36 as a purified product of the process. The remainder of the melt is forced back into reflux section 26 to form reflux which effects crystal purification. Column 24 is provided with a pulsation producing means 37 which can be operatively connected to melt product withdrawal conduit 36, as shown in the drawing, or to any other suitable point in the purification system, such as to melting section 27, reflux section 26, conduit 13, or the section of column 24 between chiller 14 and filtration section 25. Pulsation producing means 37 can comprise a cylinder 38, one end of which is in fluid communication with conduit 36, and reciprocal piston 39 mounted within cylinder 38. Piston 39 is suitably sealed in cylinder 38 by any suitable means to prevent leakage of the melt product. Reciprocation of piston 39 can be produced by any suitable means, for example by a motor 41 having suitable cams associated therewith. While the crystal mass is being advanced from chilling section 14 through filtration section 25 and reflux section 26 into melting section 27, piston 39 is reciprocated at a suitable rate, such as in the range from about 50 to about 400 pulsations per minute, so that a pulsating pressure is exerted on the melt reflux which is intermittently forced back, countercurrently with respect to the crystal mass, into reflux section 26. A check valve 42 can be provided in conduit 36 downstream of pulsation producing means 37 to prevent the backflow of withdrawn melt into column 24. If desired, check valve 42 can be replaced or augmented by a suitable valve, such as a solenoid valve, which is cyclically opened and closed in synchronism with the movement of piston 39. The rate of withdrawal of melt through conduit 36 can be set at a substantially constant rate by means of valve 43 which is actuated by flow rate controller 44 responsive to the pressure drop across an orifice 45 in conduit 36.

Electrical power is transmitted to electrical heating element 35 from electrical power source 46 by means of a suitable variable power transferring device, such as a servo motor rotated Powerstat 47. The position of Powerstat 47 can be controlled by temperature recorder-controller 48 responsive to the temperature of the melt passing through conduit 36, as determined by temperature sensing device 49, which can be any suitable means, such as a thermocouple.

At least a portion of the mother liquor withdrawn by way of conduit 31 is passed through valve 51 and conduit 52 into ion exchange bed 53. The ion exchange medium can be a cation exchange resin which preferably has been saturated with the ions of calcium, potassium and sodium to prevent the removal of these materials from the milk being processed. This can be accomplished by treating the ion exchange medium with an aqueous solution of salts of calcium, potassium and sodium, for example chlorides, followed by washing the ion exchange medium free of chloride ion.

The ion exchange medium can be a fixed bed or column of the ion exchange resin through which the concentrated milk is passed, or the ion exchange medium can be a fluidized bed of ion exchange resin dispersed in a slurry thereof with milk being processed. In the latter case, agitating means can be provided, if desired.

The concentrated milk from which a substantial portion of the radioactive materials has been removed is withdrawn through conduit 54 and valve 55 and passed through conduit 56 into a surge tank 57. Concentrated milk substantially free of radioactive materials can be withdrawn from tank 57 by way of conduit 58 as a product of the system.

When it is desired to regenerate the ion exchange media in bed 53, valve 51 can be closed and valve 59 can be opened to pass the mother liquor from conduit 31 through conduit 61 into ion exchange bed 62. The fluid in bed 53 can be drained into tank 57 and valve 55 can then be closed, while valve 63 is opened to pass treated fluid from bed 62 through conduits 64 and 56 into tank 57. Bed 52 can be regenerated by passing water through conduit 65, valve 66, valve 67 and conduit 68 into and through bed 52. The water wash leaves bed 53 by way of conduit 69 and valve 71 and is passed by way of conduit 72 to a point of treatment, storage or disposal. Upon the completion of the wash, valve 66 can be closed and an aqueous solution of the chlorides of calcium, potassium, and sodium can be passed by way of valve 73, conduits 74 and 64, valve 67 and conduit 68 into bed 53 to saturate bed 53 with calcium, potassium and sodium. This can be followed by a second water wash to remove the chloride ion. Bed 62 can be regenerated in the same manner as bed 53 and is connected to conduits 65 and 74 by way of valve 75 and conduit 76 while being connected to conduit 72 by way of valve 77 and conduit 78.

If desired a suitable acid, for example citric acid, can be introduced into the mother liquor in conduit 31 by way of conduit 79 to lower the pH of the mother liquor to a suitable value, for example on the order of 5.3. The lower value of pH increases the efficiency of the ion exchange media and thus permits a greater percentage of the strontium to be removed. A suitable material, for example a solution of potassium hydroxide and/or sodium hydroxide, can be introduced into the treated milk in conduit 56 by way of conduit 81 to readjust the pH to the normal or other desired value.

Although the invention has been illustrated as utilizing an electrical heating element 35 it is within the contemplation of the invention to utilize any suitable means for introducing heat into melting section 27 to melt the crystals. Suitable examples include an indirect fluid heat exchanger, direct heat exchange with a suitable fluid such as heated melt or a refrigerant such as butane, or an external heating means instead of or in combination with the internal heating element. Also, while chiller 14 has been illustrated as an indirect heat exchanger, any suitable means can be employed, for example, direct heat exchange with a suitable refrigerant, such as butane. While pulsation producing means 37 has been described as a piston actuated within a cylinder, it is within the contemplation of the invention to utilize any suitable means for producing the pulsations, for example a diaphragm which is vibrated by means such as an electrical solenoid or a pulsating pneumatic or hydraulic pressure. Further, while the invention has been described as utilizing one purification column and two ion exchange beds, any suitable number of purification columns can be utilized in series and/or in parallel and any desired number of ion exchange beds can be utilized in series and/or in parallel. A particular advantage of the invention is in the reduction of the number of ion exchange beds required to achieve the desired decontamination. This permits the processing of a higher volume of fresh milk with the same number of ion exchange beds or the same volume with a smaller number of beds. In general the invention can achieve a reduction of on the order of 80 percent of the number of ion exchange beds required. The lowered cost of the required ion exchange media in combination with lowered costs of storage or transportation makes the system economically attractive.

While the invention has been described with reference to a feedstock of milk, it is applicable to other aqueous solutions, for example, sea water, fruit juices such as grape, pineapple, watermelon, apple, orange, lemon, lime, tangerine, grapefruit and the like; beverages such as wine, beer, coffee, tea and the like; and vegetable juices. While the ion exchange beds have been shown connected to the mother liquor line, it is obvious that the ion exchange beds can be connected on the melt withdrawal line when appropriate, or if desired ion exchange beds can be utilized on both the mother liquor line and the melt withdrawal line.

In general it is desirable that fresh milk be passed through a suitable apparatus, such as a cream separator, for the separation of the fresh milk into a skim milk component and a fat component, with the skim milk component constituting the feed stream of the fractional crystallization process. If desired the fat component can be combined with the concentrated skim milk in conduit 30 prior to the introduction thereof into ion exchange beds 53 and/or 62; or if the concentration of radioactive materials in the fat component is sufficiently low, the fat component can be combined with the purified product from conduit 58.

The following example is presented in further illustration of the invention and is not to be construed unduly in limitation thereof:

*Example*

Milk containing 11.5 weight percent soluble solids is passed through line 10 at the rate of 1,000 pounds per hour. Recycle concentrate containing 34 weight percent soluble solids is passed via line 30 and blended with the feed in line 11 at the rate of 670 pounds per hour. The blend of feed and recycle is passed into chiller 17 at the total rate of 1,670 pounds per hour, cooled to 25° F. by heat exchange with ammonia boiling in chiller jacket 14 at a temperature of 10° F. The chiller effluent contains 620 pounds per hour of ice or 40% ice solids, the remainder being liquid milk concentrate containing 34 weight percent milk solids. The latter is removed through filter 25 at the rate of 1,050 pounds per hour with 670 pounds being recycled to feed and 380 pounds of concentrate product passed to ion exchange columns. The ice solids with occluded milk concentrate passes through reflux section 26 of crystal purification column 24 where the concentrate is removed from the ice crystals by countercurrent contact with reflux produced by the melting of the ice crystals in melt section 27. Crystals are melted by passing water at a temperature of 50° F. and a rate of 1,200 gallons per hour through a melter coil in the top of the column. Substantially pure water is taken from the top of the column through line 36 at the rate of 620 pounds per hour. Sufficient 0.75 molar citric acid is added to the milk concentrate through line 79 to reduce its pH to about 5.3. The milk is then passed at the rate of 380 pounds per hour through ion exchange column 53 at a linear rate of one foot per minute. The column has a cross-section area of one square foot and a height of 20 feet and is filled with "Dowex 50W" ion exchange resin, obtained from Dow Chemical Company.

Reasonable variation and modification are possible within the scope of the disclosure, the drawings and the appended claims to the invention.

I claim:

1. A method for the removal of radioactive material from milk which comprises passing the milk through a cooling zone and therein cooling the milk to produce a slurry of ice crystals in mother liquor, passing said slurry through a filtering zone from which a stream of mother liquor is withdrawn as a first product stream, passing the crystals and any remaining mother liquor from said filtering zone through a reflux zone and into a melting zone, introducing heat into said melting zone to melt the crystals to obtain a melt, withdrawing a portion of the melt from said melting zone as a second product stream, passing the remainder of the melt countercurrently to the movement of crystals through said reflux zone as reflux therefor and passing said first product stream through an ion exchange zone, said ion exchange zone containing a material which selectively accepts the ions of radioactive materials contained in said first product stream, recovering milk from said ion exchange zone in a concentrated form and substantially free of radioactive material, and reconstituting the thus recovered concentrated milk from said ion exchange zone to produce milk having a lower concentration of radioactive material than that obtainable by passing unconcentrated milk through said ion exchange zone.

2. A method in accordance with claim 1 wherein said radioactive material comprises strontium 90.

3. A method in accordance with claim 2 wherein said material contained in said ion exchange zone is presaturated with ions of calcium, potassium and sodium.

References Cited by the Examiner

UNITED STATES PATENTS

| 2,815,364 | 12/1957 | Green | 62—58 |
| 2,894,997 | 7/1959 | Hachmuth | 62—58 |
| 2,030,161 | 2/1962 | Murthy | 99—60 |
| 3,050,952 | 8/1962 | Marwil | 62—58 |
| 3,094,419 | 6/1963 | Singer | 99—54 |

FOREIGN PATENTS

| 865,042 | 4/1961 | Great Britain. |

NORMAN YUDKOFF, *Primary Examiner.*

S. J. EMERY, *Assistant Examiner.*